(12) United States Patent
Takizawa et al.

(10) Patent No.: US 6,419,364 B2
(45) Date of Patent: *Jul. 16, 2002

(54) PROJECTION DISPLAY DEVICE

(75) Inventors: Takeshi Takizawa, Shiojiri; Hideoki Miyake, Matsumoto, both of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,701

(22) Filed: Jul. 16, 1999

(30) Foreign Application Priority Data

Jul. 16, 1998 (JP) ............................................. 10-202342

(51) Int. Cl.[7] ......................... G03B 21/16; G03B 21/18; H04N 5/74
(52) U.S. Cl. .............................. 353/52; 353/57; 353/58; 348/748
(58) Field of Search ............................. 353/30, 31, 34, 353/52, 57, 58, 60, 61; 348/748

(56) References Cited

U.S. PATENT DOCUMENTS

| | | | | |
|---|---|---|---|---|
| 4,283,658 A | * | 8/1981 | Parker ........................ | 315/117 |
| 5,136,397 A | * | 8/1992 | Miyashita .................... | 348/748 |
| 5,666,171 A | * | 9/1997 | Nakamura et al. ............ | 349/58 |
| 5,993,011 A | * | 11/1999 | Smock et al. ................ | 353/119 |
| 6,007,205 A | * | 12/1999 | Fujmori ....................... | 353/57 |
| 6,111,630 A | * | 8/2000 | Watanuki et al. ........... | 349/161 |
| 6,132,049 A | * | 10/2000 | Yamaguchi et al. .......... | 353/61 |

* cited by examiner

*Primary Examiner*—Russell Adams
*Assistant Examiner*—Rodney Fuller
(74) *Attorney, Agent, or Firm*—Oliff & Berridge, PLC

(57) ABSTRACT

This invention concerns reducing fan noise and preventing a light source, an optical element, and the like from deteriorating in a projector display device. The projection display device includes a light-source lamp unit, an optical system unit having a modulation device, a projection lens for enlarging and projecting an image formed by the optical system, a power supply unit for supplying electric power for driving the device, power supply intake fans, a modulation device intake fan, and exhaust fans. Fan noise can be reduced by driving only the power supply intake fans for a predetermined period after the device is powered on. Furthermore, the light-source lamp, the optical elements, and the like can be prevented from deteriorating by controlling the rotation speeds of the other fans based on detected temperatures detected by temperature sensors.

19 Claims, 13 Drawing Sheets

|  | DURING STANDBY PERIOD | AFTER STANDBY PERIOD |
| --- | --- | --- |
| FAN 16 | STOP | LOW SPEED - MEDIUM SPEED - HIGH SPEED - STOP |
| FAN 17A FAN 17B | LOW SPEED | HIGH SPEED - STOP |
| FAN 17C | STOP | LOW SPEED - HIGH SPEED - STOP |

FIG. 8

PROJECTION DISPLAY DEVICE

BACKGROUND OF THE INVENTION

1. Field of Invention

The present invention relates to a projection display device, and more particularly, to a technique for efficiently cooling components arranged inside the device by using cooling air.

2. Description of Related Art

Hitherto, a projection display device has been known which includes a light-source lamp serving as a light source, an optical system for forming an optical image according to image information by optically processing a light beam emitted from the light-source lamp, a projection lens for enlarging and projecting the image formed by the optical system onto a projection plane, a power supply for supplying electric power for driving the device, and an intake fan and an exhaust fan for cooling the inside of the device.

Such projection display devices are widely used for multimedia presentations at conferences, academic meetings, exhibitions, and the like.

In such projection display devices, noise from the intake fan and the exhaust fan is a problem. On the other hand, the light source, the optical elements, and the like disposed inside the device may be deteriorated when the temperatures thereof exceed a predetermined temperature. Deterioration of these components results in reduction in image quality and the like, and this is undesirable.

SUMMARY OF THE INVENTION

One aspect of the present invention is to provide a projection display device in which such fan noise is minimized, and in which a light source, an optical element, and the like are prevented from deteriorating.

A projection display device of the present invention includes a light source; a modulation device for modulating a light beam emitted from the light source; a projection lens for projecting the light modulated by the modulation device onto a projection plane; a power supply for supplying electric power for driving the device; an exhaust fan for exhausting air inside the device; a power supply intake fan primarily for drawing in air for cooling the power supply; and a modulation device intake fan primarily for drawing in air for cooling the modulation device. The invention may provide that only the power supply intake fan is driven for a predetermined period after the device is powered on. According to this, for a predetermined period after the device is powered on, only the power supply intake fan, which must be cooled from the time of power-on, is driven, whereby fan noise can be reduced.

In the above-described projection display device, fan noise can be further reduced by rotating the power supply intake fan at a relatively low speed for a predetermined period after the device is powered on, and by rotating the power supply intake fan at a relatively high speed after the predetermined period has elapsed from the time of power-on.

In the above-described projection display device, when a rotation speed control device is provided to control the rotation speed of the exhaust fan, the rotation speed of the fan can be limited while the inside of the device is maintained at a relatively low temperature, which can reduce fan noise.

When a lens is placed in the optical path between the light source and the modulation device, it is preferable that the rotation speed of the exhaust fan be controlled based on a detected temperature from a first temperature detecting device for detecting the temperature in the vicinity of the light source, or a detected temperature from a second temperature detecting device for detecting the temperature in the vicinity of the lens. This makes it possible to prevent the light source and the lens from deteriorating, and to thereby prevent reduction in image quality.

In this case, it is preferable that the light source be extinguished when the detected temperature from the first temperature detecting device, or the detected temperature from the second temperature detecting device continues to be higher than a predetermined preset temperature for a predetermined period. This makes it possible to reliably prevent the light source and the lens from deteriorating.

Furthermore, after the light source is extinguished, a kickback phenomenon sometimes occurs in which the detected temperature from the temperature detecting device rises although the temperature inside the device is actually low. Therefore, if the light source is extinguished the moment the detected temperature exceeds the predetermined preset temperature, it may not be possible to relight the light source later even though the temperature inside the device is actually low. In contrast, when the light source is extinguished when the detected temperature remains higher than the predetermined preset temperature for the predetermined period, the light source can be relighted even when the detected temperature from the temperature detecting device is higher than the predetermined preset temperature. That is, according to such a configuration, it is possible to prevent the relighting of the light source from being hindered by the kickback phenomenon.

Furthermore, in the projection display device of the present invention, the rotation speed of the modulation device intake fan can be limited while the inside of the device is maintained at a relatively low temperature, by providing a rotation speed control device for controlling the rotation speed of the modulation device intake fan, which can reduce fan noise.

In this case, it is preferable that the rotation speed of the modulation device intake fan be controlled based on a detected temperature from a third temperature detecting device for detecting the temperature in the vicinity of the modulation device, or a detected temperature from a fourth temperature detecting device for detecting the temperature of outside air. This makes it possible to prevent the modulation device from deteriorating, and to thereby prevent reduction in image quality.

Furthermore, in this case, it is preferable that a preset temperature for changing the rotation speed of the modulation device intake fan be varied in accordance with the detected temperature from the fourth temperature detecting device. There is a small difference between the detected temperature from the third temperature detecting device for detecting the temperature in the vicinity of the modulation device, and the actual temperature of the modulation device. Therefore, if the rotation speed of the intake fan is controlled only by the third temperature detecting device, it may be insufficient, even though cooling efficiency for the modulation device must be increased in practice. In contrast, when the preset temperature for changing the rotation speed of the modulation device intake fan is varied in accordance with the detected temperature from the fourth temperature detecting device, it is possible to control the rotation speed of the modulation device intake fan in a more suitable state, and to more reliably prevent the modulation device from deteriorating.

In this case, it is preferable that the light source be extinguished when the detected temperature from the third temperature detecting device, or the detected temperature from the fourth temperature detecting device remains higher than a predetermined preset temperature for a predetermined period. This makes it possible to prevent the relighting of the light source from being hindered by the kickback phenomenon described above.

BRIEF DESCRIPTION OF THE DRAWINGS

FIG. 8 is a diagram illustrating the control of fans in the embodiment;

DETAILED DESCRIPTION OF PREFERRED EMBODIMENTS

An embodiment of the present invention will be described below with reference to the drawings.

(1) Overall Configuration of the Device

Figure 1:
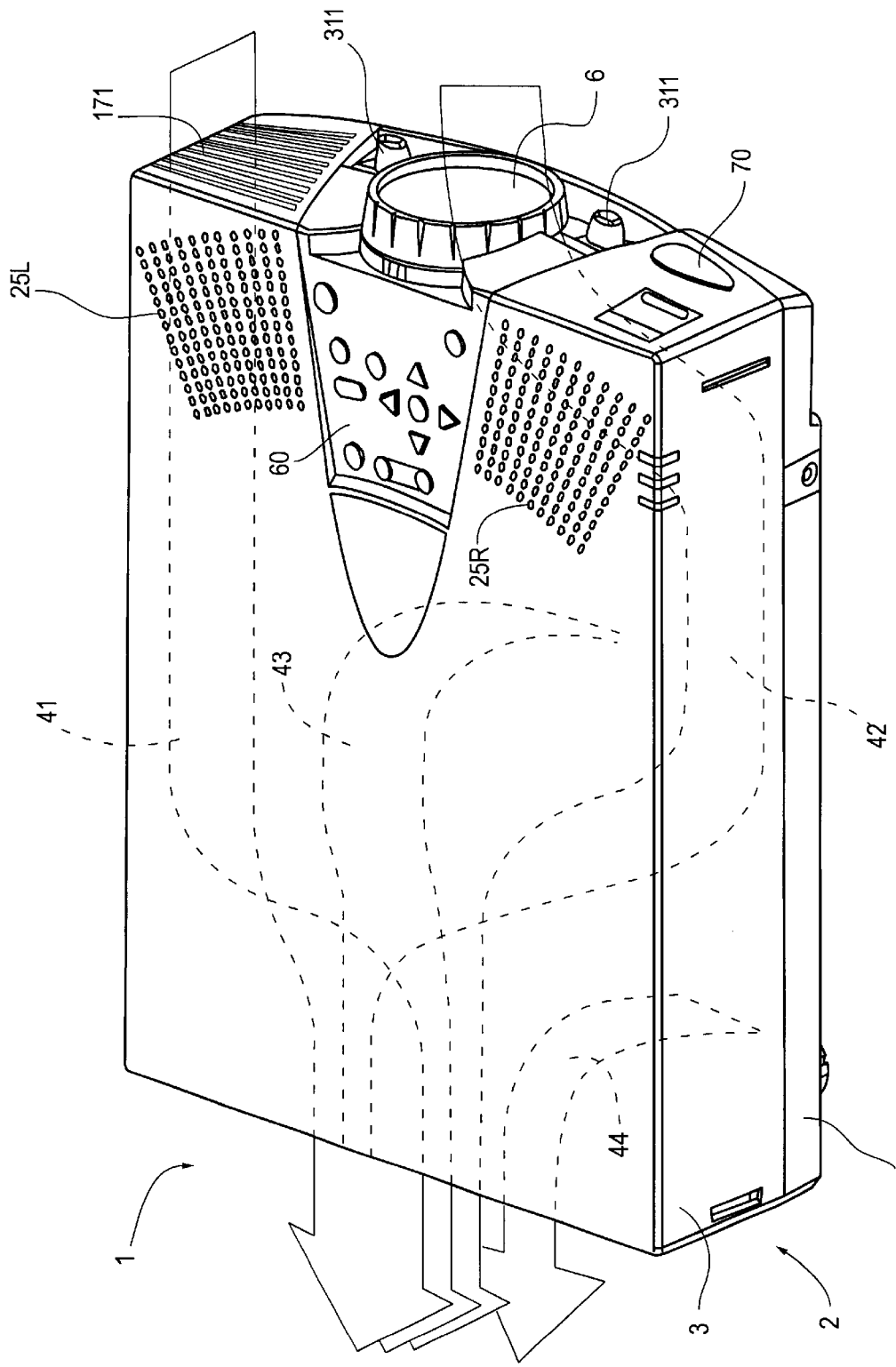
FIG. 1 is an outward perspective view of a projection display device according to an embodiment of the present invention, as viewed from the top side.
Figure 2:
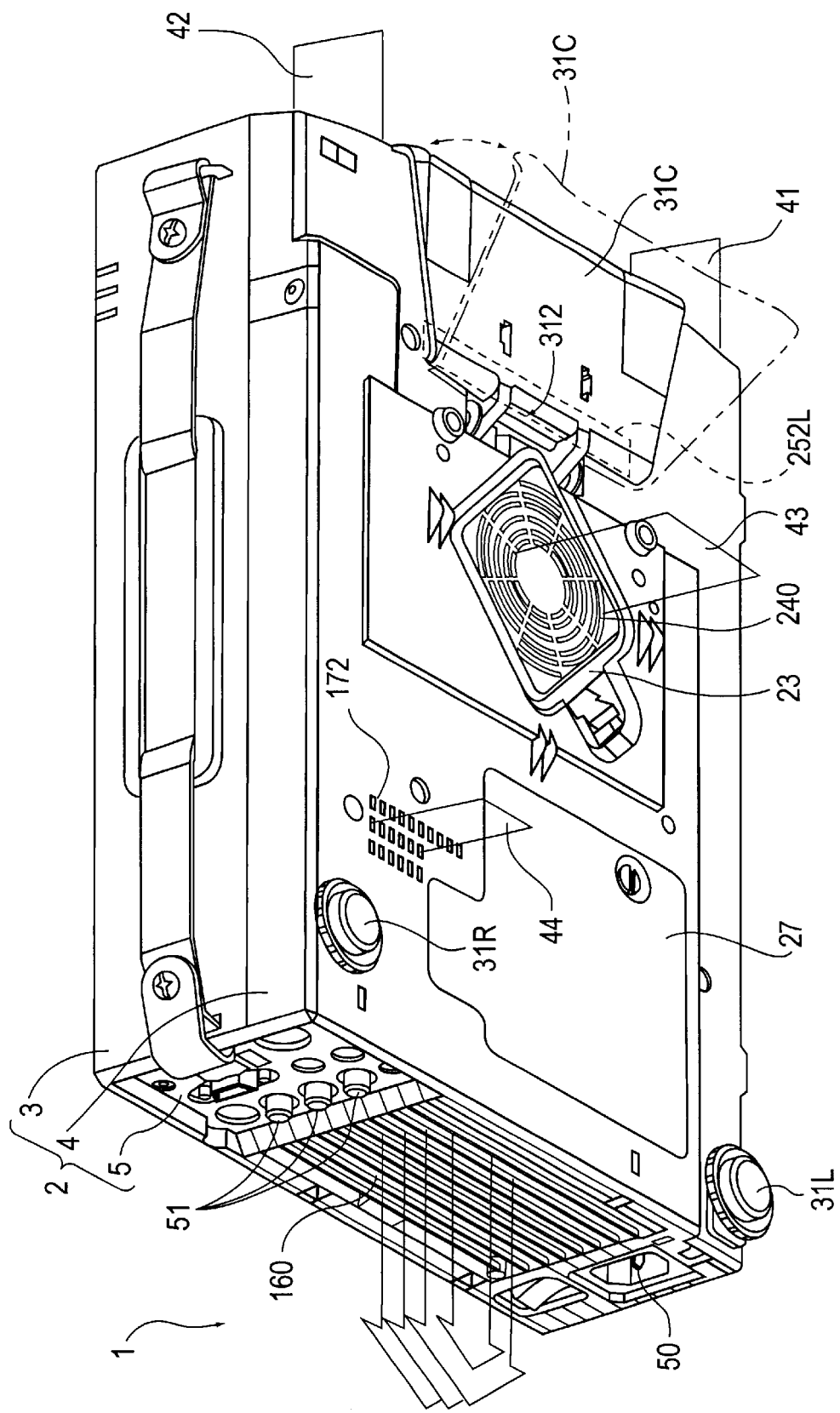
FIG. 2 is an outward perspective view of the projection display device according to the embodiment, as viewed from the bottom side.

FIGS. 1 and 2 are schematic perspective views of a projection display device 1 according to this embodiment. FIG. 1 is a perspective view, as viewed from the top side, and FIG. 2 is a perspective view, as viewed from the bottom side.

The projection display device 1 is of the type that separates a light beam emitted from a light-source lamp, which serves as a light source, into beams of the three primary colors, red (R), green (G), and blue (B), modulates these color light beams via liquid crystal light valves (modulation system) according to image information, synthesizes the modulated color beams using a prism (color synthesizing optical system), and enlarges and projects the synthesized light beams onto a projection plane via a projection lens 6. The respective components excluding a part of the projection lens 6 are housed inside an outer casing 2.

(2) Structure of Outer Casing

The outer casing 2 basically includes an upper casing 3 for covering the top face of the device, a lower casing 4 for forming the bottom face of the device, and a rear casing 5 (FIG. 2) for covering the rear face.

As shown in FIG. 1, many communication holes 25R and 25L are formed at the right and left front ends of the top face of the upper casing 3. Between these communication holes 25R and 25L, a control panel 60 is disposed to control image quality, and the like of the projection display device 1. Furthermore, a light receiving portion 70 is provided at the left bottom of the front face of the upper casing 3 so as to receive an optical signal from a remote control that is not shown.

As shown in FIG. 2, the bottom face of the lower casing 4 is provided with a lamp replacement cover 27 through which a light-source lamp unit 8 (which will be described below) held inside is replaced, and an air filter cover 23 having an air inlet 240 for cooling the inside of the device.

The bottom face of the lower casing 4 is also provided, as shown in FIG. 2, with a foot 31C at about the front center end, and feet 31R and 31L at the right and left rear corners. The foot 31C is turned via a turning mechanism 312 (FIG. 2) disposed on its rear side by raising levers 311 shown in FIG. 1, and is urged into an open state in which it is separated on its front side from the main body of the device, as shown by a double-dotted chain line in FIG. 2. By controlling the amount of turn, the vertical position of a display screen on the projection plane can be changed. In contrast, the feet 31R and 31L are extended or retracted in the projecting direction by being turned. By controlling the amount of extension or retraction, the inclination of the display screen can be changed.

In the rear casing 5, as shown in FIG. 2, an AC inlet 50 for an external power supply, and a group of various kinds of input-output terminals 51 are arranged. An air outlet 160 is formed adjacent to these input-output terminals 51 so as to exhaust air inside the device therethrough.

(3) Inner Configuration of the Device

Figure 3:
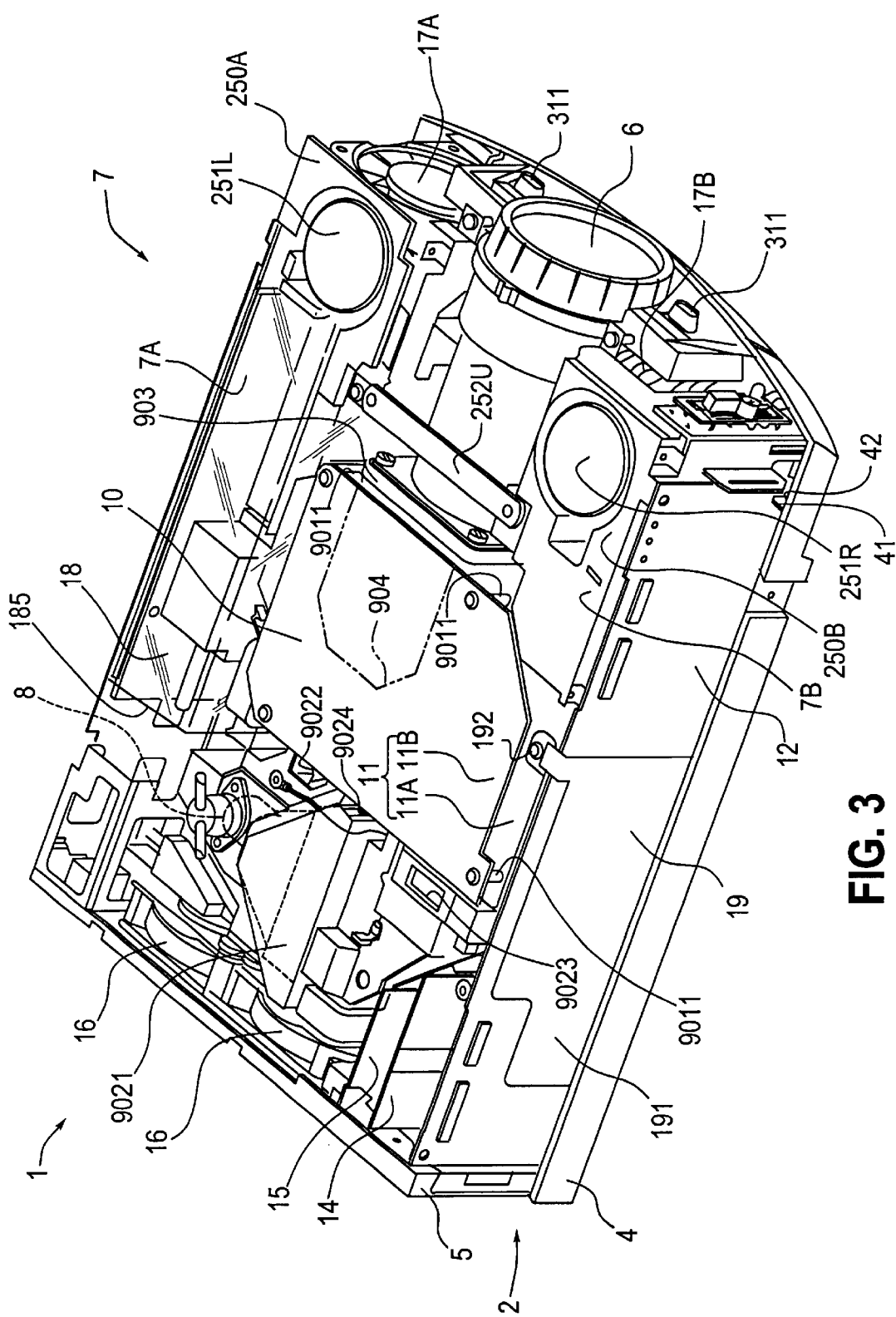
FIG. 3 is a perspective view showing the internal configuration of the projection display device of the embodiment.
Figure 4:
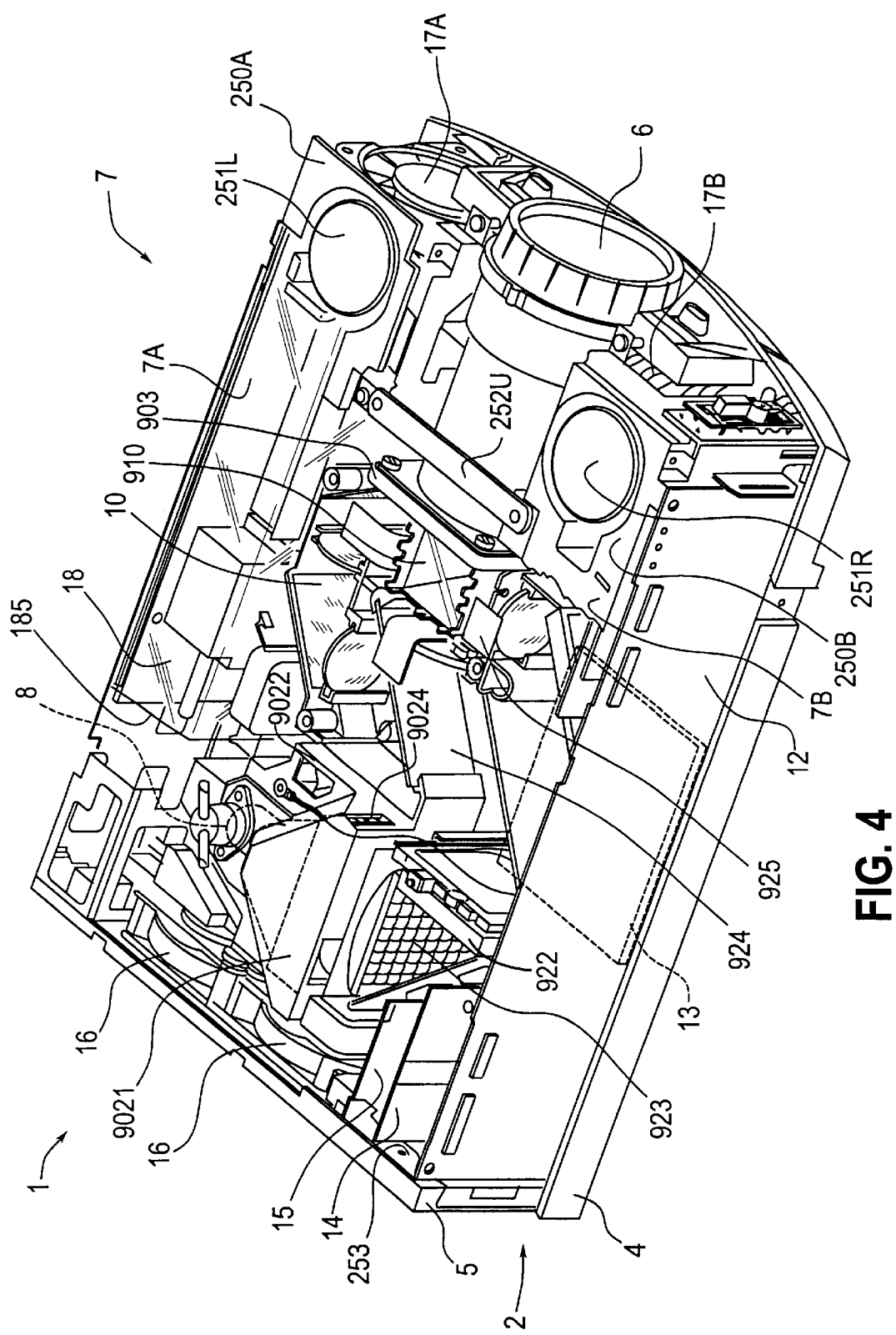
FIG. 4 is a perspective view of an optical system inside the projection display device of the embodiment.
Figure 5:
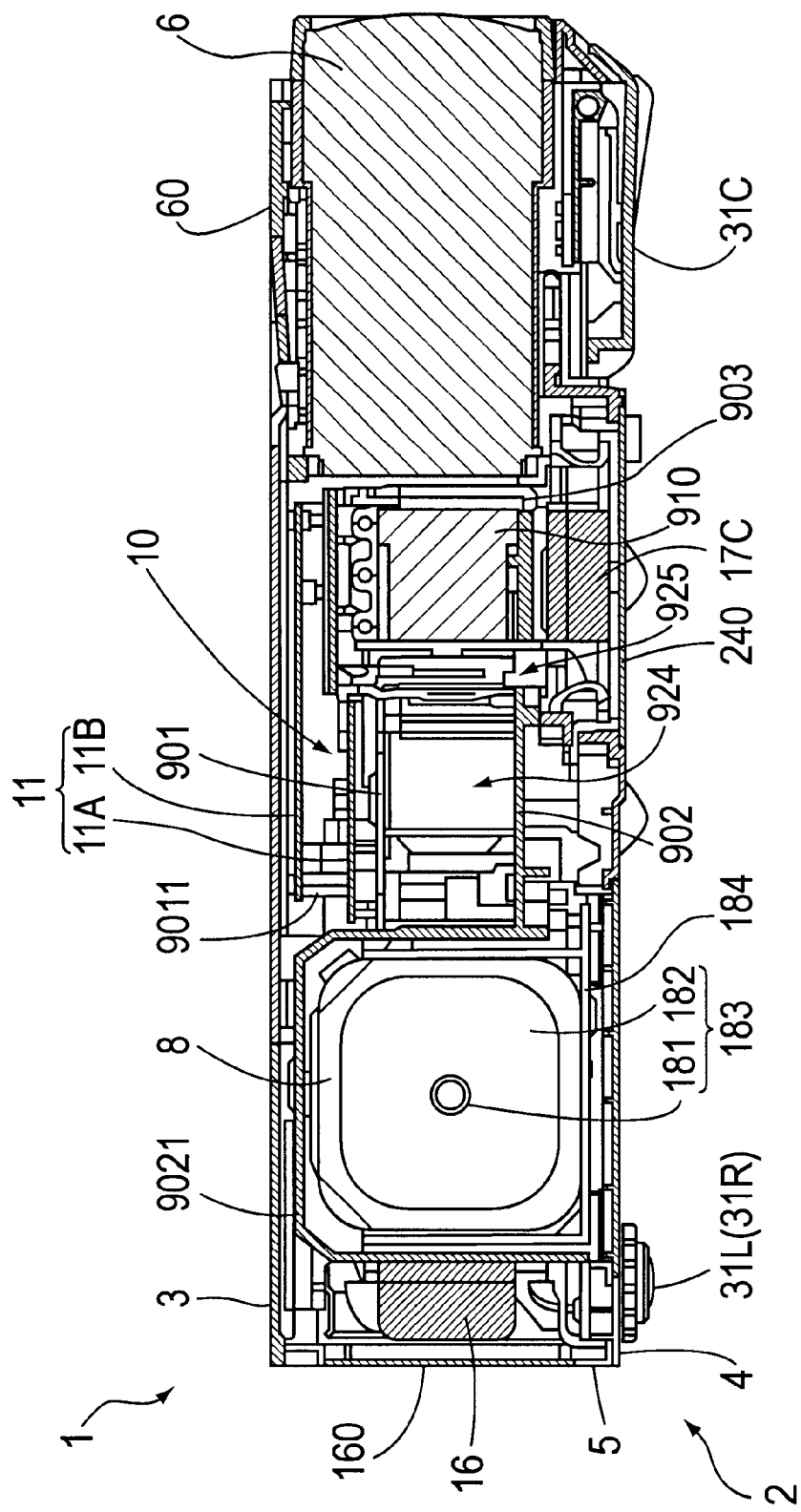
FIG. 5 is a vertical sectional view showing the internal configuration of the projection display device of the embodiment.

FIGS. 3 to 5 show the inner configuration of the projection display device 1. FIGS. 3 and 4 are schematic perspective views showing the inside of the device, and FIG. 5 is a vertical sectional view of the projection display device 1.

As these figures show, a power supply unit 7 serving as a power supply, the light-source lamp unit 8, an optical unit 10 forming an optical system, a pair of upper and lower driver boards 11 serving as modulation element driving substrates, a main board 12 serving as a control circuit substrate, and the like are arranged inside the outer casing 2.

Figure 6:
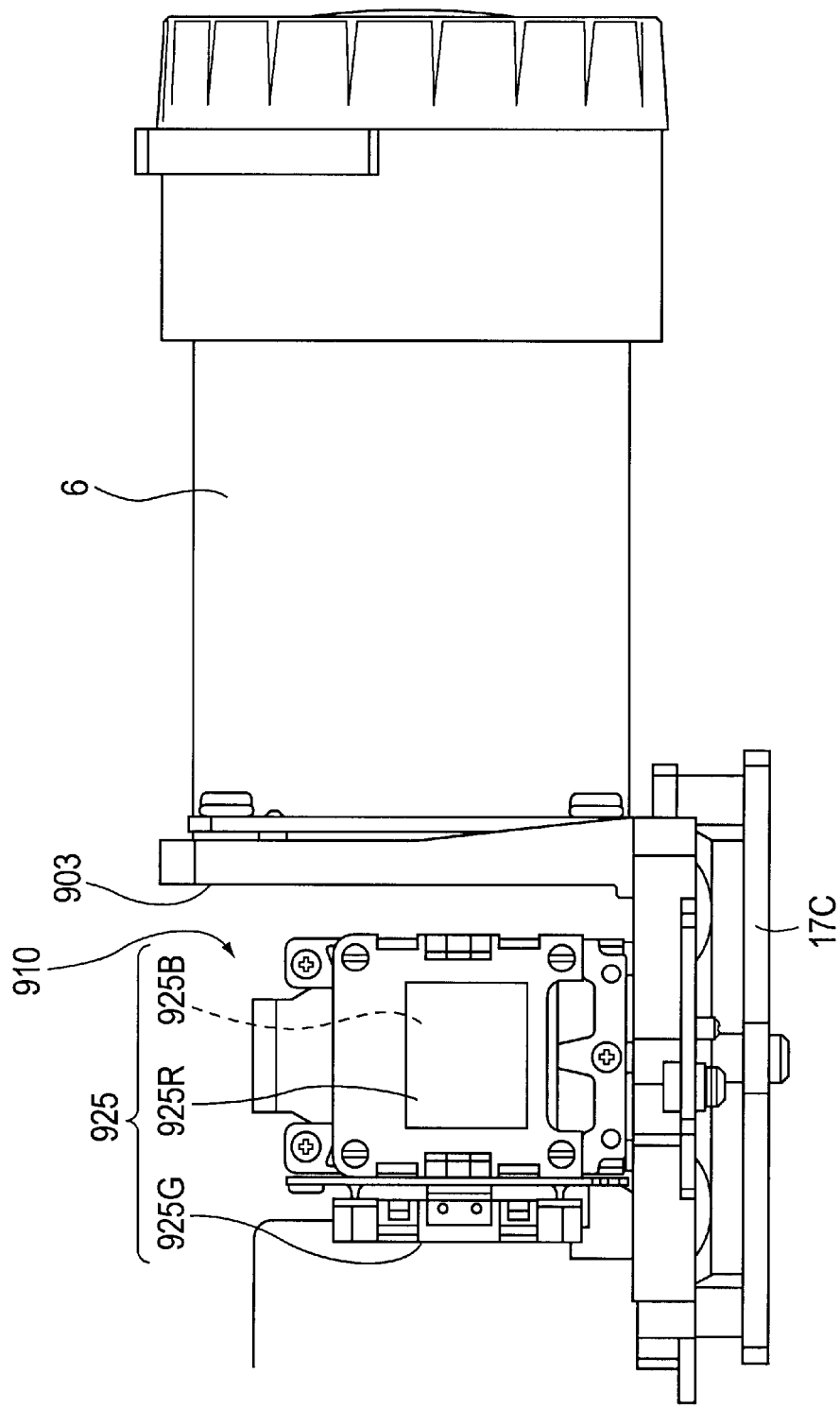
FIG. 6 is a vertical sectional view of a structure according to the embodiment in which a modulation system, a color synthesizing optical system, and a projection lens are mounted.

The power supply unit 7 is composed of first and second power supply blocks 7A and 7B disposed on both sides of the projection lens 6. The first power supply block 7A transforms electric power obtained via the AC inlet 50, and mainly supplies the power to the second power supply block 7B and the light-source lamp unit 8. The first power supply block 7A comprises a power-supply circuit substrate on which a transformer, a rectifier circuit, a smoothing circuit, a voltage stabilizing circuit, and the like are formed, and a lamp driving substrate 18 for driving a light-source lamp 181 in the light-source lamp unit 8, which will be described below. The lamp driving substrate 18 is covered with a transparent resin cover 185. The second power supply block 7B further transforms and supplies the electric power obtained from the first power supply block 7A, and includes a power-supply circuit substrate on which a transformer and various circuits are formed, in a manner similar to the first power supply block 7A. The electric power is supplied to another power-supply circuit substrate 13 disposed below the optical unit 10 (shown by a dotted line in FIG. 4), and first and second intake fans 17A and 17B placed adjacent to the respective power supply blocks 7A and 7B. A power-supply circuit on the power-supply circuit substrate 13 mainly generates electric power for driving a control circuit on the main board 12 based on the electric power from the second power supply block 7B, and also generates electric power for other low-power components. The second intake fan 17B is disposed between the second power supply block 7B and the projection lens 6 so as to draw cooling air from the outside into the inside through a clearance formed between the projection lens 6 and the upper casing 3 (FIG. 1). The power supply blocks 7A and 7B include conductive cover members 250A and 250B made of aluminum or the like, respectively. The respective cover members 250A and 250B are provided with speakers 251R and 251L for voice output at the positions corresponding to the communication holes 25R and 25L formed through the upper casing 3. These cover members 250A and 250B are mechanically and electrically connected at the top by a conductive metal plate 252U, as shown in FIG. 6, are electrically connected at the bottom by a metal plate 252L (shown by a dotted line in FIG. 2), and are finally grounded via a GND (ground) line of the inlet 50. Of these metal plates 252U and 252L, the metal plate 252L is previously fixed to the lower casing 4 made of resin, and both ends thereof are brought into contact with the lower surfaces of the cover members 250A and 250B to establish continuity therebetween, by assembling the respective power supply blocks 7A and 7B and the lower casing 4.

The light-source lamp unit 8 constitutes a light-source section of the projection display device 1, and comprises a light-source device 183 including a light-source lamp 181, a reflector 182, and a lamp housing 184 for housing the light-source device 183. Such a light-source lamp unit 8 is covered with a housing portion 9021 that is formed integrally with a lower light guide 902 (FIG. 5), and is structured so that it can be detached through the above-described lamp replacement cover 27. In the rear of the housing portion 9021, a pair of exhaust fans 16 are arranged on the right and left sides at the positions corresponding to the air outlet 160 of the rear casing 5. Although will be described in detail below, the exhaust fans 16 lead cooling air drawn by the first to third intake fans 17A to 17C into the housing portion 9021 from an opening formed adjacent thereto, cool the light-source lamp unit 8 by this cooling air, and then exhaust the cooling air from the air outlet 160. Electric power is supplied to the respective exhaust fans 16 from the power-supply circuit substrate 13.

The optical unit 10 is a unit that forms an optical image corresponding to image information by optically processing a light beam emitted from the light-source lamp unit 8, and includes an illumination optical system 923, a color separation optical system 924, a modulation system 925, and a prism unit 910 serving as a color synthesizing optical system. The optical elements in the optical unit 10, other than the modulation system 925 and the prism unit 910, are vertically held between upper and lower light guides 901 and 902. These upper and lower light guides 901 and 902 are combined with each other, and are fixed to the lower casing 4 by fixing screws. These upper and lower light guides 901 and 902 are similarly fixed to the prism unit 910 by fixing screws.

The prism unit 910 shaped like a rectangular parallelepiped is fixed by fixing screws to the back side of a head member 903 that is a structure formed of an integrally molded piece of magnesium and having a nearly L-shaped profile, as shown in FIG. 6. Respective liquid crystal light valves 925R, 925G, and 925B, which serve as optical modulation elements for constituting the modulation system 925 are placed to face three side faces of the prism unit 910, and are similarly fixed to the head member 903 by fixing screws. The liquid crystal light valve 925B is positioned to be opposed to the liquid crystal light valve 925R across the prism unit 910 (FIG. 7), and only a leader line (dotted line) and a reference numeral thereof, are shown in FIG. 6.

The liquid crystal light valves 925R, 925G, and 925B are cooled by cooling air from a third intake fan 17C that is placed on the lower surface of the head member 903 corresponding to the above-described air inlet 240. In this case, electric power for the third intake fan 17C is supplied from the power-supply circuit substrate 13 via the driver board 11. Furthermore, the base end of the projection lens 6 is similarly fixed to the front face of the head member 903 by fixing screws. The head member 903, which is thus equipped with the prism unit 910, the modulation system 925, and the projection lens 6, is fixed to the lower casing 4 by fixing screws, as shown in FIG. 5.

The driver boards 11 serve to drive and control the respective liquid crystal light valves 925R, 925G, and 925B in the modulation system 925 described above, and are disposed above the optical unit 10. A lower driver board 11A and an upper driver board 11B are separated from each other via a stud bolt 9011, and have many elements, which are not shown, for constituting a driving circuit and the like, mounted on the opposing surfaces thereof. That is, most of the elements are efficiently cooled by cooling air that flows between the respective driver boards 11. Such cooling air is mainly drawn in by the above-described third intake fan 17C, cools the respective liquid crystal light valves 925R, 925G, and 925B, and then flows between the respective driver boards 11 through an opening 904 (shown by a double-dotted chain line in FIG. 3) of the upper light guide 901.

The main board 12 is provided with a control circuit for controlling the overall projection display device 1, and stands on the side of the optical unit 10. Such a main board 12 is electrically connected to the driver boards 11, the control panel 60 described above, an interface substrate 14 having the group of input-output terminals 51, a video substrate 15, and the power-supply circuit substrate 13 via a connector or the like. The control circuit of the main board 12 is driven by electric power generated by the power-supply circuit on the power-supply circuit substrate 13, that is, electric power from the second power supply block 7B. The main board 12 is cooled by cooling air that flows from the second intake fan 17B that passes through the second power supply block 7B.

In FIG. 3, a guard member 19 made of metal, such as aluminum, is interposed between the main board 12 and the outer casing 2 (only the lower casing 4 and the rear casing 5 are shown in FIG. 3). The guard member 19 has a large planar portion 191 that spreads between the top and bottom ends of the main board 12, is fixed at the top to the cover member 250B of the second power supply block 7A by a fixing screw 192, and is engaged with and supported by, for example, a slit in the lower casing 4 at the bottom. As a result, the upper casing 3 (FIG. 1) and the main board 12 are prevented from interfering with each other in combining the upper casing 3 with the lower casing 4, so that the main board 12 is protected from external noise.

(4) Configuration of Optical System

Next, the configuration of the optical system in the projection display device 1, that is, the optical unit 10, will be described with reference to FIG. 7 as a schematic view.

As described above, the optical unit 10 includes the illumination optical system 923 for uniformizing the in-plane illumination distribution of a light beam (W) from the light-source lamp unit 8, the color separation optical system 924 for separating the light beam (W) from the illumination optical system 923 into red (R), green (G), and blue (B) beams, the modulation system 925 for modulating the respective color beams R, G, and B according to image information, and the prism unit 910 that serves as the color synthesizing optical system for synthesizing the respective modulated color beams.

The illumination optical system 923 includes a reflecting mirror 931 for bending an optical axis 1a of the light beam W emitted from the light-source lamp unit 8 toward the front of the device, and a first lens plate 921 and a second lens plate 922 disposed on both sides of the reflecting mirror 931.

The first lens plate 921 includes a plurality of rectangular lenses arranged in a matrix form, splits the light beam emitted from the light source into a plurality of partial beams, and collects the respective partial beams near the second lens plate 922.

The second lens plate 922 includes a plurality of rectangular lenses arranged in a matrix form, and has the function of superimposing the respective partial beams emitted from the first lens plate 921 onto the liquid crystal light valves 925R, 925G, and 925B (which will be described later) for constituting the modulation system 925.

In this way, since the liquid crystal light valves 925R, 925G, and 925B can be illuminated with light having substantially uniform illuminance by the illumination optical system 923 in the projection display device 1 of this embodiment, it is possible to achieve a projection image having uniform illuminance.

The color separation optical system 924 includes a blue and green reflecting dichroic mirror 941, a green reflecting dichroic mirror 942, and a reflecting mirror 943. First, a blue beam B and a green beam G contained in the light beam W emitted from the illumination optical system 923 are perpendicularly reflected by the blue and green reflecting dichroic mirror 941, and travel toward the green reflecting dichroic mirror 942.

A red beam R passes through the blue and green reflecting dichroic mirror 941, is perpendicularly reflected by the reflecting mirror 943 disposed at the rear thereof, and emerges from an emergent portion 944 for the red beam R toward the prism unit 910. Next, only the green beam G of the blue and green beams B and G reflected by the blue and green reflecting dichroic mirror 941 is perpendicularly reflected by the green reflecting dichroic mirror 942, and emerges from an emergent portion 945 for the green beam G toward the prism unit 910. The blue beam B passed through the green reflecting dichroic mirror 942 emerges from an emergent portion 946 for the blue beam B toward a light guide system 927. In this embodiment, the distances from an emergent portion of the illumination optical system 923 for the light beam W to the emergent portions 944, 945, and 946 of the color separation optical system 924 for the respective color beams R, G, and B, are set to be equal.

On the emergent sides of the emergent portions 944 and 945 of the color separation optical system 924 for the red and green beams R and G, condenser lenses 951 and 952 are disposed, respectively. Therefore, the red and green beams R and G emitted from the respective emergent portions enter these condenser lenses 951 and 952, where they are collimated.

The red and green beams R and G thus collimated pass through incident-side polarizers 960R and 960G, and enter the liquid crystal light valves 925R and 925G, where they are modulated and given image information corresponding to the respective color beams. That is, these liquid crystal light valves 925R and 925G are subjected to switching control according to image information by the above-described driver boards 11, thereby modulating the respective color beams passing therethrough. In contrast, the blue beam B is guided to the corresponding liquid crystal light valve 925B via the light guide system 927, where it is similarly subjected to modulation according to image information. As the liquid crystal light valves 925R, 925G, and 925B of this embodiment, for example, liquid crystal light valves may be adopted that use a polysilicon TFT as a switching element.

The light guide system 927 includes a condenser lens 954 disposed on the emergent side of the emergent portion 946 for the blue beam B, an incident-side reflecting mirror 971, an emergent-side reflecting mirror 972, an intermediate lens 973 interposed between these reflecting mirrors, and a condenser lens 953 disposed before the liquid crystal light valve 925B. The blue beam B emerging from the condenser lens 953 passes through an incident-side polarizer 960B, and enters the liquid crystal light valve 925B, where it undergoes modulation. In this case, the optical axis 1a of the light beam W and the optical axes 1r, 1g, and 1b of the respective color beams R, G, and B are formed in the same plane. The blue beam B has the longest one of the optical path lengths of the respective color beams, namely, the distances from the light-source lamp 181 to the respective liquid crystal panels. Therefore, this light beam undergoes the largest light loss. The light loss can, however, be reduced by interposing the light guide system 927.

Next, the respective color beams R, G, and B modulated through the respective liquid crystal light valves 925R, 925G, and 925B pass through emergent-side polarizers 961R, 961G, and 961B, and enter the prism unit 910, where they are synthesized. A color image synthesized by the prism unit 910 is enlarged and projected via the projection lens 6 onto a projection plane 100 that is disposed at a predetermined position.

(5) Description of Cooling Flow Paths

Next, a description will be given of cooling flow paths formed in the projection display device 1.

In the projection display device 1, as is schematically shown by the arrows in FIGS. 1 and 2, there are mainly formed a first power supply block cooling flow path 41, a second power supply block cooling flow path 42, a modulation system cooling flow path 43, and a light source cooling flow path 44. However, cooling air circulating through the respective cooling flow paths 41 to 44 does not exactly flow along the arrows in the figures, and is drawn in and exhausted nearly along the arrows through the spaces between the respective components.

The first power supply block cooling flow path 41 is a path for cooling air that is drawn in from an air inlet 171 by the first intake fan 17A (FIGS. 3 and 4). The cooling air cools the first power supply block 7A, and then cools the lamp driving substrate 18 disposed at the rear thereof. In this case, the cooling air flows inside the resin cover 185 that is open at both front and rear ends, and the direction of the flow is thereby limited to one direction, which can reliably maintain a sufficient flow rate to cool the lamp driving substrate 18. After that, the cooling air flows into the housing portion 9021 from an opening 9022 formed at the top thereof, or another opening or space that is not shown, cools the light-source lamp unit 8 (light-source lamp 181) disposed therein, and is exhausted from the air outlet 160 by the exhaust fans 16.

The second power supply block cooling flow path 42 is a path for cooling air that is drawn in by the second intake fan 17B. The cooling air cools the second power supply block 7B, and then cools the main board 12 disposed at the rear thereof. Furthermore, the cooling air flows into the housing portion 9021 from an opening 9023 adjacent thereto or the like, cools the light-source lamp unit 8, and is exhausted from the air outlet 160 by the exhaust fans 16.

Figure 7:
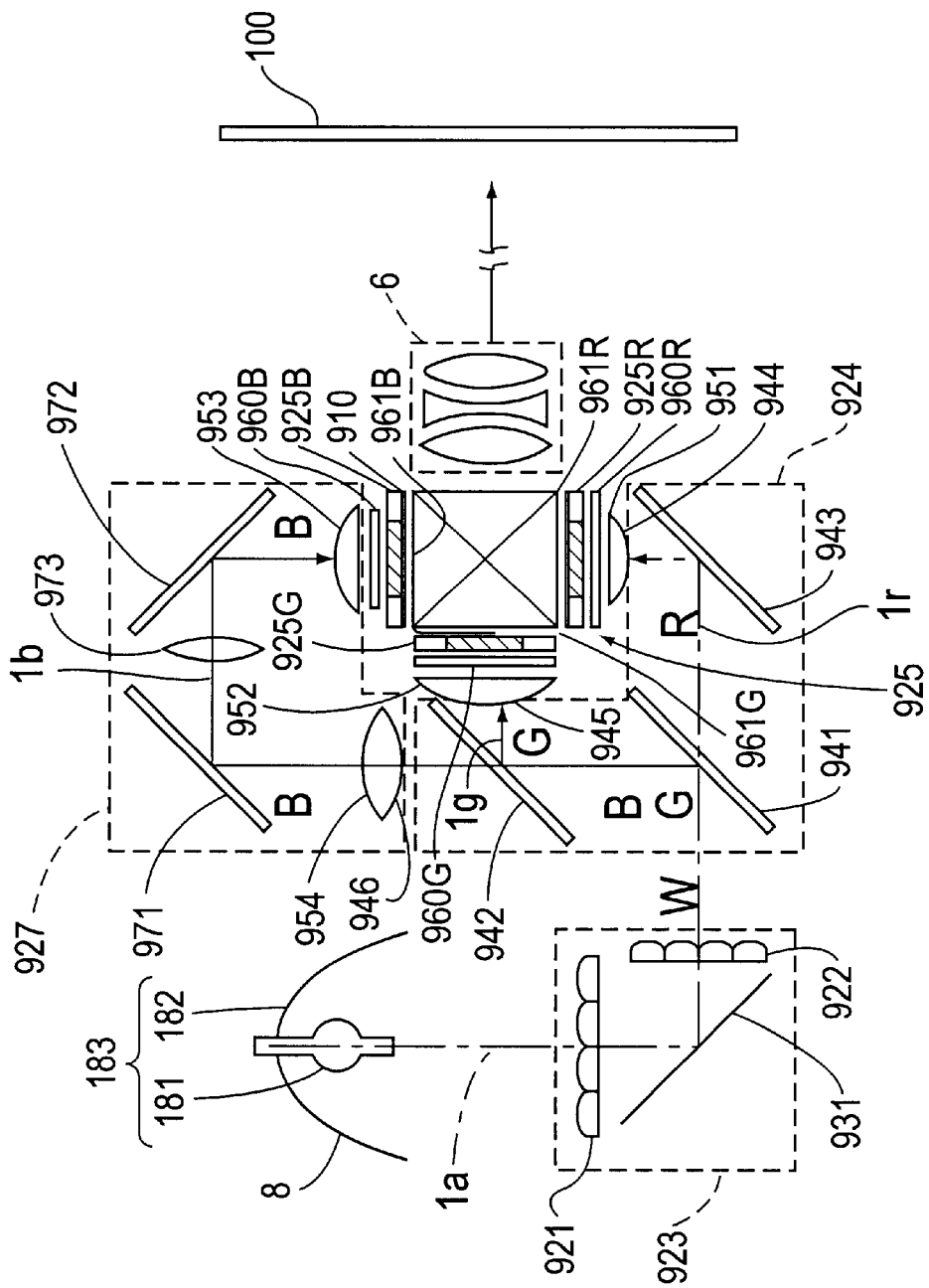
FIG. 7 is a schematic view showing the configuration of the optical system in the projection display device of the embodiment.

The modulation system cooling flow path 43 is a path for cooling air that is drawn in by the third intake fan 17C shown in FIGS. 5 and 7. As described above, the cooling air cools the respective liquid crystal light valves 925R, 925G, and 925B, flows between the upper and lower driver boards 11A and 11B through the opening 904 of the upper light guide 901 disposed directly above, and flows to the rear side along the opposing surfaces of the respective driver boards 11A and 11B. That is, the respective driver boards 11A and 11B form a part of the modulation system cooling flow path 43, and the elements mounted on the opposing surfaces thereof, which face the modulation system cooling flow path 43, are thereby efficiently cooled. The cooling air flows in the housing portion 9021 through another opening 9024 as well as the above-described openings 9022 and 9023 to cool the light-source lamp unit 8, and is similarly exhausted from the air outlet 160.

The light source cooling flow path 44 is a path for cooling air drawn in from an air inlet 172 (FIG. 2) on the lower surface of the lower casing 4. The cooling air is drawn in by the exhaust fans 16. After being drawn in from the air inlet 172, the cooling air flows in the housing portion 9021 from an opening or space formed in the lower surface thereof, cools the respective components of the illumination optical system 923, cools the light-source lamp unit 8, and is exhausted from the air outlet 160.

(6) Control of Fans

Next, a description will be given of the control of the intake fans 17A to 17C and the exhaust fans 16.

After the device is powered on, the exhaust fans 16 are still stopped during a standby period, as shown in FIG. 8. After the standby period terminates, the exhaust fans 16 are controlled to be in four states: a low-speed rotation state, a medium-speed rotation state, a high-speed rotation state, and a stopped state, based on the detected temperatures detected by a lamp temperature sensor for detecting the temperature in the vicinity of the light-source lamp unit 8 (FIG. 7), and a lens plate temperature sensor for detecting the temperature in the vicinity of the second lens plate 922 (FIG. 7). After the device is powered on, the first intake fan 17A and the second intake fan 17B are controlled to rotate at low speed during the standby period and to rotate at high speed after the standby period, regardless of the temperatures detected by the temperature sensors. The third intake fan 17C is stopped during the standby period after the device is powered on. After the termination of the standby period, the third intake fan 17C is controlled to be in three states: a low-speed rotation state, a high-speed rotation state, and a stopped state, based on the temperatures detected by an outside air temperature sensor for detecting the outside air temperature, and a light valve temperature sensor for detecting the temperature in the vicinity of the liquid crystal light valves 925R, 925G, and 925B (FIG. 7).

Figure 9:
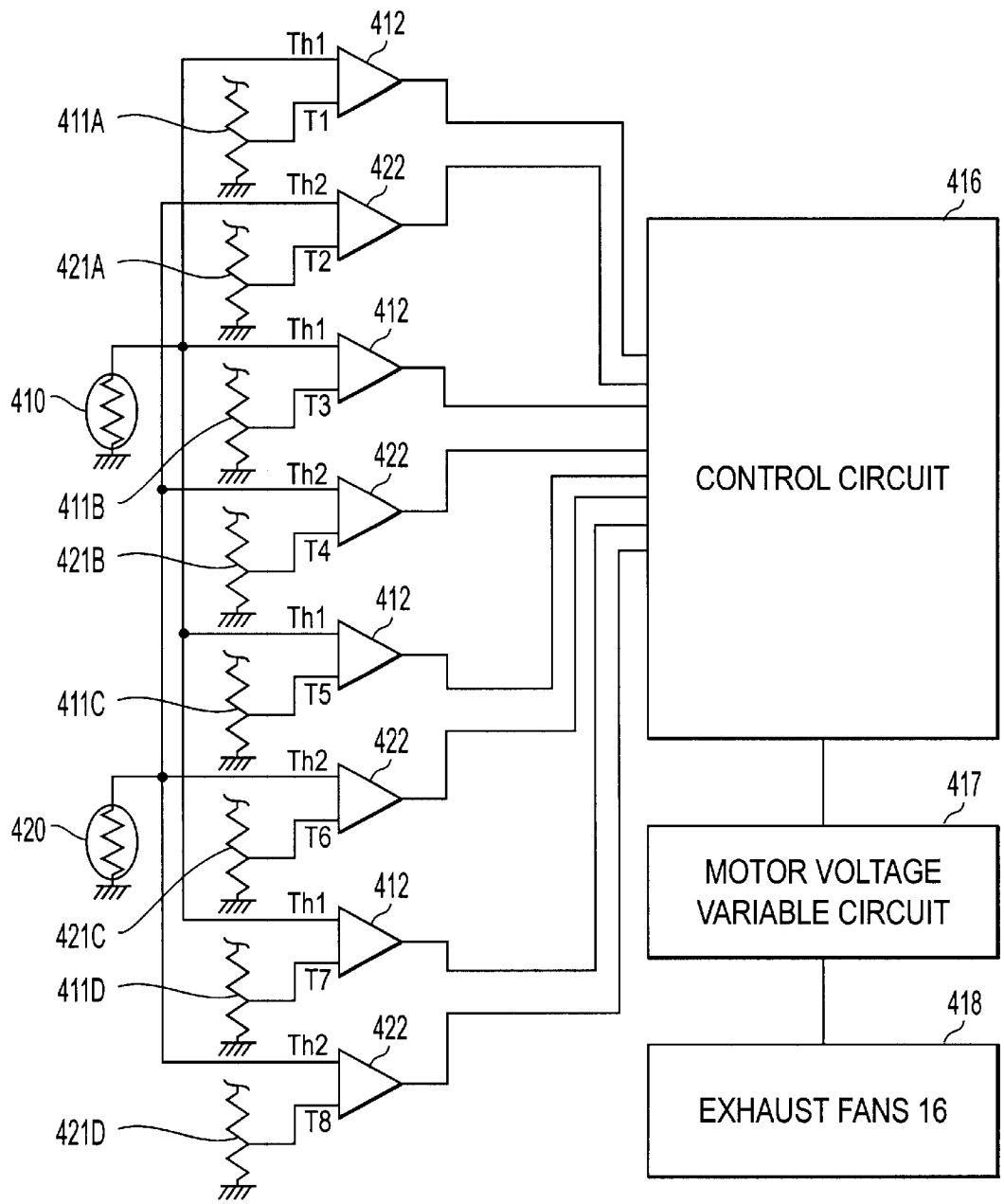
FIG. 9 is a block diagram showing the configuration of a control device for controlling the number of revolutions of exhaust fans 16 in the embodiment.

FIG. 9 shows the configuration of a control device for controlling the number of revolutions of the exhaust fans 16. As shown in this figure, the control device for controlling the number of revolutions of the exhaust fans 16 includes voltage setting circuits 411A, 411B, 411C, and 411D for respectively providing voltages according to preset temperatures T1, T3, T5, and T7; voltage setting circuits 421A, 421B, 421C, and 421D for respectively providing voltages according to preset temperatures T2, T4, T6, and T8; comparison circuits 412 for comparing a detected temperature Th1 detected by a lamp temperature sensor 410 for detecting the temperature in the vicinity of the light-source lamp unit 8 (FIG. 7), and the preset temperatures T1, T3, T5, and T7 of the respective voltage setting circuits 411A to 411D; and comparison circuits 422 for comparing a detected temperature Th2 detected by a lens plate temperature sensor 420 for detecting the temperature in the vicinity of the second lens plate 922 (FIG. 7), and the preset temperatures T2, T4, T6, and T8 of the respective voltage setting circuits 421A to 421D. A control circuit 416 controls a motor voltage variable circuit 417 according to outputs from the comparison circuits 412 and the comparison circuits 422. The number of revolutions of the exhaust fans 16 is controlled by the motor voltage variable circuit 417. The preset temperatures T1, T3, T5, and T7 follow the relation T1<T3<T5<T7. The preset temperatures T2, T4, T6, and T8 follow the relation T2<T4<T6<T8.

Figure 10:
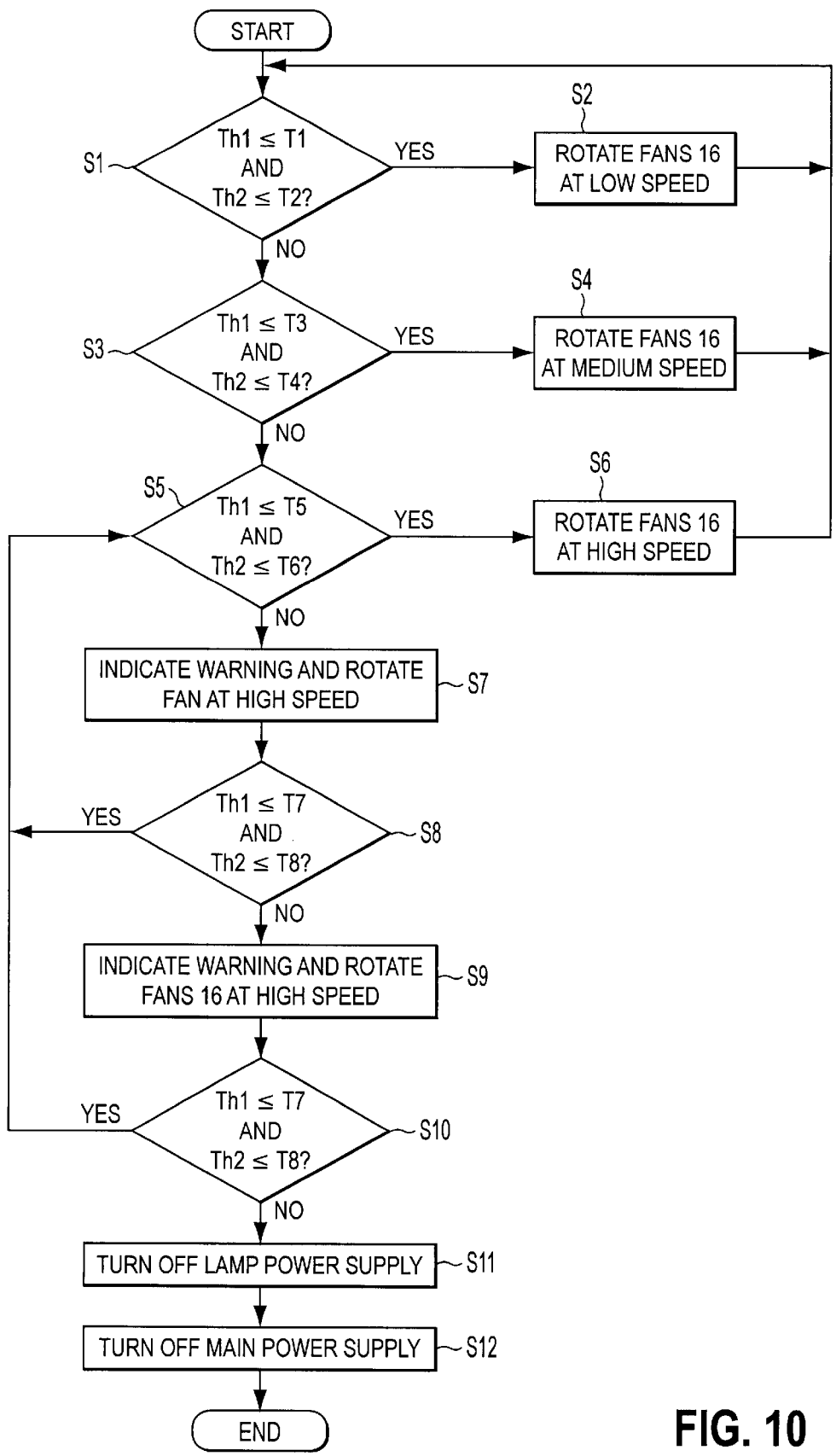
FIG. 10 is a flowchart showing the drive control of the exhaust fans 16 by a control circuit shown in FIG. 9.

FIG. 10 is a flowchart showing the drive control of the exhaust fans 16 executed by this control circuit. First, in step S1, it is determined whether the detected temperature Th1 from the temperature sensor 410 is lower than or equal to the preset temperature T1, and the detected temperature Th2 from the temperature sensor 420 is lower than or equal to the preset temperature T2. In the case where both are lower than or equal to the preset temperatures (YES), a signal is output to the motor voltage variable circuit 417 in step S2 so as to rotate the exhaust fans 16 at low speed, and step S1 is performed again. In contrast, when one of the detected temperatures is higher than the preset temperature (NO) in step S1, step S3 is performed.

In step S3, it is determined whether the detected temperature Th1 from the temperature sensor 410 is lower than or equal to the preset temperature T3, and the detected temperature Th2 from the temperature sensor 420 is lower than or equal to the preset temperature T4. When both are lower than or equal to the preset temperatures (YES), a signal is output to the motor voltage variable circuit 417 in step S4 so as to rotate the exhaust fans 16 at medium speed, and step S1 is performed again. In contrast, when one of the temperatures is higher than the preset temperature (NO) in step S3, step S5 is performed.

In step S5, it is determined whether the detected temperature Th1 from the temperature sensor 410 is lower than or equal to the preset temperature T5, and the detected temperature Th2 from the temperature sensor 420 is lower than or equal to the preset temperature T6. In the case where both are lower than or equal to the preset temperatures (YES), a signal is output to the motor voltage variable circuit 417 in step S6 so as to rotate the exhaust fans 16 at high speed, and step S1 is performed again. In contrast, when one of the detected temperatures is higher than the preset temperature (NO) in step S5, a signal is output to the motor voltage variable circuit 417 in step S7 so as to rotate the exhaust fans 16 at high speed, and a signal is also output to light a warning lamp that is not shown. That is, when the temperature in the vicinity of the lamp unit 8 (FIG. 7) exceeds the preset temperature T5, or when the temperature in the vicinity of the second lens plate 922 (FIG. 7) exceeds the preset temperature T6, not only are the exhaust fans 16 rotated at high speed, but also the user is warned that the internal temperature is high.

Subsequently, it is determined in step S8 whether the detected temperature Th1 from the temperature sensor 410 is lower than or equal to the preset temperature T7 and the detected temperature Th2 from the temperature sensor 420 is lower than or equal to the preset temperature T8. When both are lower than or equal to the preset temperatures (YES), step S5 is performed again. In contrast, when any of these temperatures are higher than the preset temperature (NO), a signal is output in step S9 so as to rotate the exhaust fans 16 at high speed, and a signal is also output so as to light the warning lamp (not shown). That is, even when the detected temperature Th1 from the temperature sensor 410 exceeds T7, or when the detected temperature Th2 from the temperature sensor 420 exceeds the preset temperature T8, the exhaust fans 16 continue to rotate at high speed for a predetermined period while the warning lamp is kept lit.

After the predetermined period has elapsed, it is determined again in step S10 whether the detected temperature Th1 from the temperature sensor 410 is lower than or equal to the preset temperature T7 and the detected temperature Th2 from the temperature sensor 420 is lower than or equal to the preset temperature T8. When both are lower than or equal to the preset temperatures (YES), step S5 is performed again. In contrast, when any of these is higher than the preset temperature (NO), a lamp power supply is turned off in step S11, thereby extinguishing the light-source lamp 181 in the lamp unit 8 (FIG. 7). After a predetermined period has elapsed, the main power supply is turned off in step S12. While the light-source lamp 181 is off, the main power supply remains on for a predetermined period so as to rotate the intake fans 17A, 17B, and 17C, and the exhaust fans 16. After the temperature inside the device is thereby lowered to some extent, the main power supply is turned off to stop these fans.

Figure 11:
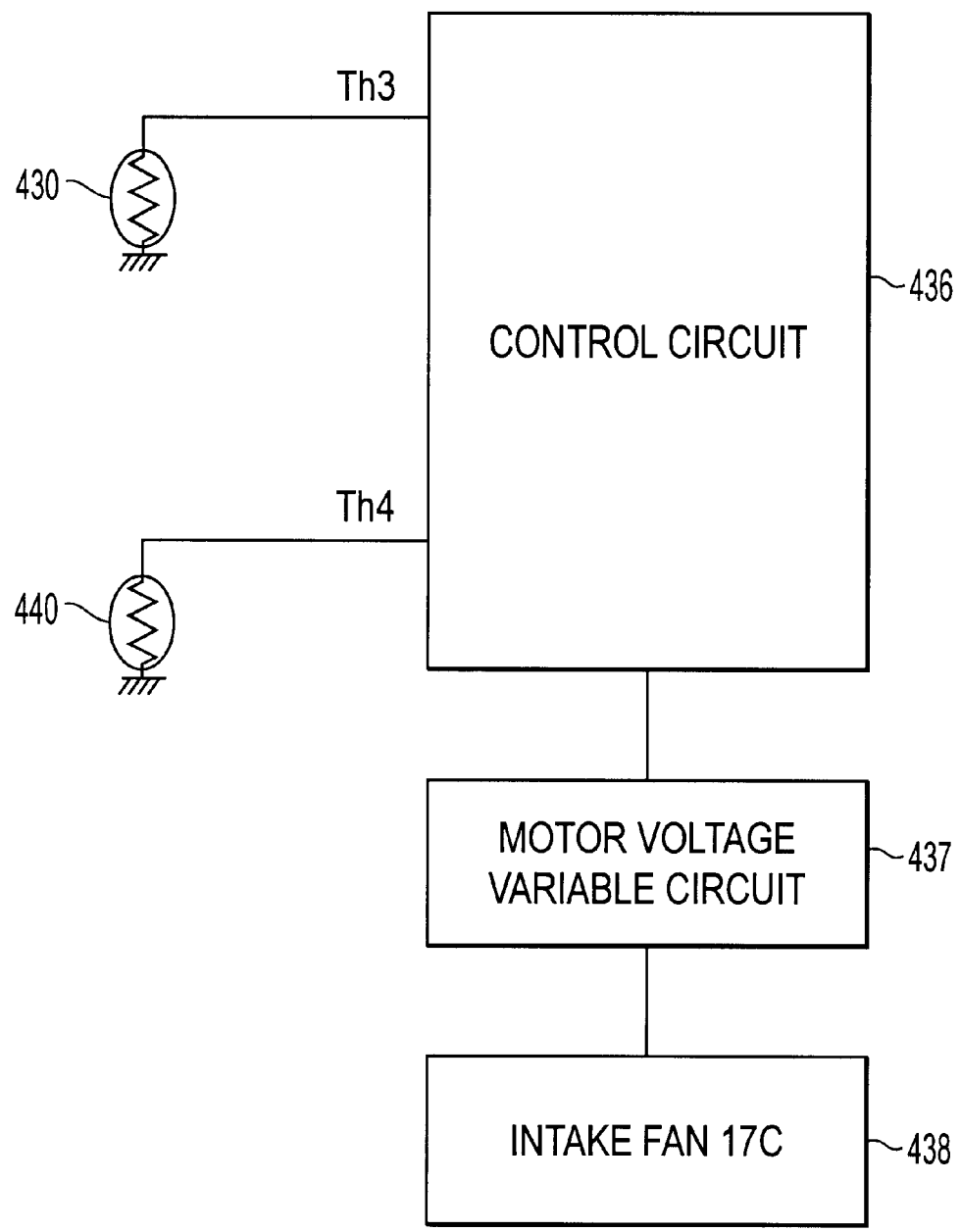
FIG. 11 is a block diagram showing the configuration of a control device for controlling the number of revolutions of an intake fan 17C in the embodiment.

FIG. 11 shows the configuration of a control device for controlling the number of revolutions of the third intake fan 17C. As shown in this figure, the control device for controlling the number of revolutions of the intake fan 17C includes a light valve temperature sensor 430 for detecting the temperature in the vicinity of the liquid crystal light valves 925R, 925G, ad 925B, and an outside air temperature sensor 440 for detecting the temperature of outside air to be drawn into the device from the air inlet 240. A control circuit 436 controls a motor voltage variable circuit 437 based on a temperature Th3 detected by the temperature sensor 430 and a temperature Th4 detected by the temperature sensor 440. The number of revolutions of the intake fan 17 is controlled by the motor voltage variable circuit 437.

Figure 12:
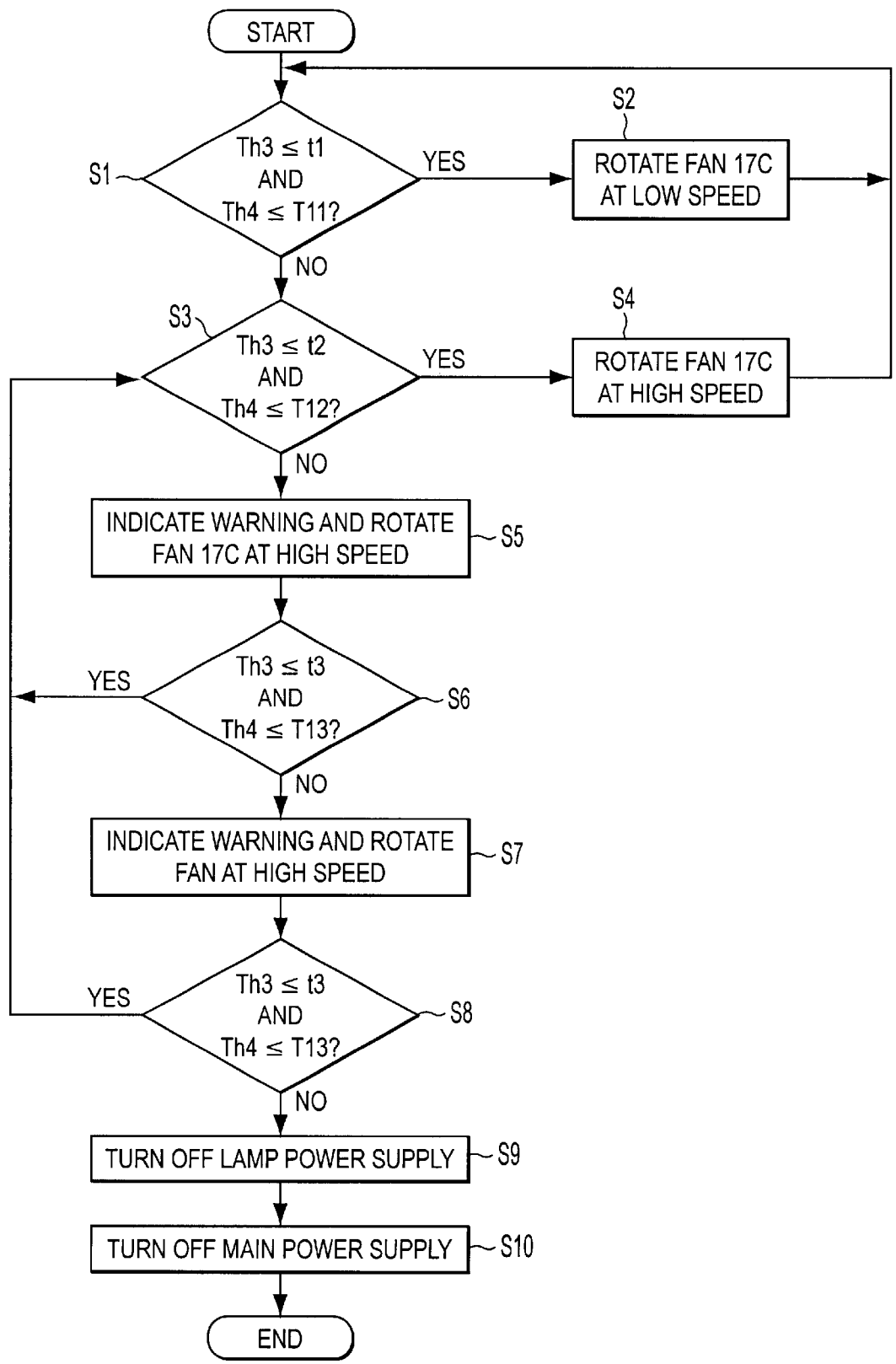
FIG. 12 is a flowchart showing the drive control of the intake fan 17C by a control circuit shown in FIG. 11.

FIG. 12 is a flowchart showing the drive control of the intake fan 17C executed by the control circuit 436. First, it is determined in step S1 whether the detected temperature Th3 from the temperature sensor 430 is lower than or equal to a preset temperature t1 and the detected temperature Th4 from the temperature sensor 440 is lower than or equal to a preset temperature T11. When both are lower than or equal to the preset temperatures (YES), a signal is output to the motor voltage variable circuit 437 in step S2 so as to rotate the exhaust fan 17C at low speed, and step S1 is performed again. In contrast, when any of these temperatures are higher than the preset temperature (NO), step S3 is performed.

In step S3, it is determined whether the detected temperature Th3 from the temperature sensor 430 is lower than or equal to a preset temperature t2 and the detected temperature Th4 from the temperature sensor 440 is lower than or equal to a preset temperature T12. When both are lower than or equal to the preset temperatures (YES), a signal is output to the motor voltage variable circuit 437 in step S4 so as to rotate the intake fan 17C at high speed, and step S1 is performed again. In contrast, when any of these is higher than the preset temperature (NO) in step S3, a signal is output to the motor voltage variable circuit 437 in step S5 so as to rotate the intake fan 17C at high speed, and a signal is also output so as to light a warning lamp that is not shown. That is, when the detected temperature Th3 from the light valve temperature sensor exceeds the preset temperature t2, or when the detected temperature from the outside air temperature sensor 440 exceeds the preset temperature T12, not only is the intake fan 17C rotated at high speed, but also the user is warned that the internal temperature is high.

Subsequently, it is determined in step S6 whether the detected temperature Th3 from the temperature sensor 430 is lower than or equal to a preset temperature t3 and the detected temperature Th4 from the temperature sensor 440 is lower than or equal to a preset temperature T13. When both are lower than or equal to the preset temperatures (YES), step S3 is performed again. In contrast, when any of these is higher than the preset temperature (NO), a signal is output in step S7 so as to rotate the intake fan 17C at high speed, and a signal is also output so as to light a warning lamp that is not shown. That is, even when the detected temperature Th3 from the temperature sensor 430 exceeds t3, or when the detected temperature Th4 from the temperature sensor 440 exceeds the preset temperature T13, the intake fan 17C continues to rotate at high speed for a predetermined period while the warning lamp is kept lit.

After the predetermined period has elapsed, it is determined again in step S8 whether the detected temperature Th3 from the temperature sensor 430 is lower than or equal to the preset temperature t3 and the detected temperature Th4 from the temperature sensor 440 is lower than or equal to the preset temperature T13. When both are lower than or equal to the preset temperatures (YES), step S3 is performed again. In contrast, when any of these is higher than the preset temperature (NO), the lamp power supply is turned off in step S9, thereby extinguishing the light-source lamp 181 (FIG. 7) in the lamp unit 8. After a predetermined period has elapsed, the main power supply is turned off in step S10. That is, while the light-source lamp 181 is off, the main power supply remains on for the predetermined period to rotate the intake fans 17A, 17B, and 17C, and the exhaust fans 16. After the temperature inside the device is thereby lowered to some extent, the main power supply is turned off to stop these fans.

Figure 13:
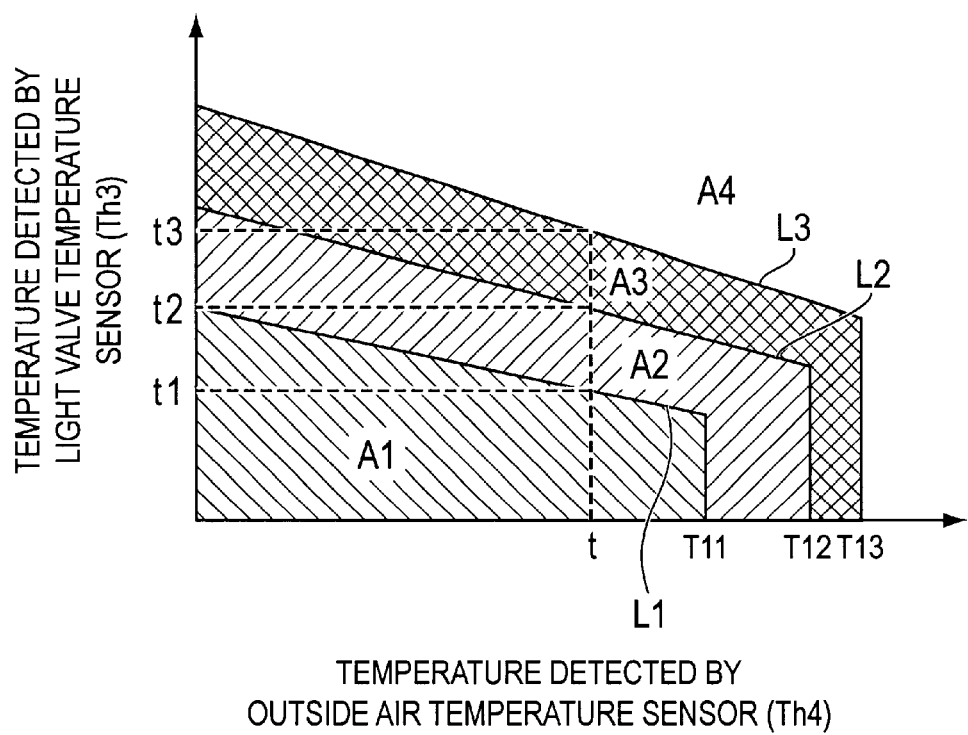
FIG. 13 is a graph illustrating a method of setting preset temperatures t1, t2, and t3 shown in FIG. 12.

In this way, the rotation speed of the intake fan 17C is switched at the preset temperatures t1, t2, and t3, and the preset temperatures T11, T12, and T13 that serve as critical points. The preset temperatures T11, T12, and T13 are fixed values, and follow the relation T11<T12<T13. In contrast, the preset temperatures t1, t2, and t3 vary in accordance with the detected temperature Th4 of the outside air temperature sensor 440. This effect is shown in FIG. 13. In FIG. 13, straight lines L1, L2, and L3 are represented as L1=a1*Th4+b1, L2=a2*Th4+b2, and L3=a3*Th4+b3, respectively. A region A1 is a region where control is executed to rotate the intake fan 17C at low speed, that is, where control is executed corresponding to step S2 in FIG. 12. A region A2 is a region where control is executed to rotate the intake fan 17C at high speed, that is, where control is executed corresponding to step S4 in FIG. 12. A region A3 is a region where control is executed to rotate the intake fan 17C at high speed and to light the warning lamp, that is, where control is executed corresponding to step S5 in FIG. 12. A region A4 is a region where control is executed corresponding to steps S7 to S10 in FIG. 12. As shown in FIG. 13, the preset temperatures t1, t2, and t3 are determined by finding an intersection of a straight line Th4=t and the straight line L1, an intersection of the straight line Th4=t and the straight line L2, and an intersection of the straight line Th4=t and the straight line L3, respectively. That is, the preset temperatures t1, t2, and t3 vary in accordance with the detected temperature Th4 of the outside air temperature sensor 440.

(6) Advantages of the Embodiment

The embodiment described above provides the following advantages.

1) During the standby period after the device is powered on, only the intake fans 17A and 17B are driven primarily to cool the power supply blocks 7A and 7B that must be cooled from the time of power-on. This can reduce noise from the fans.

2) The intake fans 17A and 17B are rotated at a relatively low speed during the standby period after the device is powered on, and are rotated at a relatively high speed after the standby period has elapsed. Therefore, it is possible to further reduce noise from the fans.

3) Since the control device is provided to control the rotation speed of the exhaust fans 16, it is possible to limit the rotation speed of the fans 16 while the inside of the device is maintained at a relatively low temperature, and thereby reduce noise from the fans.

4) The lens plate 922 is placed in the optical path between the light-source lamp unit 8 and the liquid crystal light valves 925R, 925G, and 925B, and the rotation speed of the exhaust fans 16 is controlled based on the detected temperature Th1 from the temperature sensor 410 for detecting the temperature in the vicinity of the light-source lamp unit 8, and the detected temperature Th2 from the temperature sensor 420 for detecting the temperature in the vicinity of the lens plate 922. Therefore, it is possible to prevent the light-source lamp 181 and the lens plate 922 from deteriorating, and to thereby prevent reduction in image quality.

5) The light-source lamp 181 is extinguished when the detected temperature Th1 from the temperature sensor 410 or the detected temperature Th2 from the temperature sensor 420 remains higher than the predetermined preset temperature T7 or T8 for a predetermined period. Therefore, it is possible to reliably prevent the light-source lamp 181 and the lens plate 922 from deteriorating. Although the temperature inside the device is actually lowered after the light-source lamp 181 is extinguished, a kickback phenomenon sometimes occurs in which the detected temperature from the temperature sensor 410 or 420 rises. Therefore, if the light-source lamp 181 is extinguished the moment the detected temperature exceeds the preset temperature T7 or T8, it may not be possible to relight the light-source lamp 181 later even though the temperature inside the device is actually low. In this embodiment, however, the light-source lamp 181 is extinguished when the detected temperature remains higher than the preset temperature T7 or T8 for a predetermined period. Therefore, even if the detected temperature from the temperature sensor 410 or 420 is higher than the preset temperature T7 or T8 when the main power supply is turned on immediately after being turned off, the main power supply is not immediately turned off. When the kickback phenomenon has ended after the predetermined period has elapsed, the main power supply is not turned off, and the light-source lamp 181 is lit. That is, according to this embodiment, it is possible to prevent the turning on of the main power supply of the device and the relighting of the light-source lamp 181 from being hindered by the kickback phenomenon, even though the temperature inside the device has actually reached a temperature that allows the device to be used after the main power supply is turned off.

6) Chiefly, since the control device is provided to control the rotation speed of the intake fan 17C, it is possible to limit the rotation speed of the intake fan 17C while the inside of the device is maintained at a relatively low temperature, and to thereby reduce noise from the fan.

7) The rotation speed of the intake fan 17C is controlled based on the detected temperature Th3 from the temperature sensor 430 for detecting the temperature in the vicinity of the liquid crystal light valves 925R, 925G, and 925B, or the detected temperature Th4 from the temperature sensor 440 for detecting the temperature of outside air. Therefore, it is possible to prevent the liquid crystal light valves 925R, 925G, and 925B from deteriorating, and to thereby prevent reduction in image quality.

8) The preset temperatures t1, t2, and t3 for changing the rotation speed of the intake fan 17C are varied in accordance with the detected temperature Th4 from the temperature sensor 440. There is a small difference between the detected temperature Th3 from the temperature sensor 430 for detecting the temperature in the vicinity of the liquid crystal light valves 925R, 925G, and 925B, and the actual temperature of the light valve. Therefore, if the rotation speed of the intake fan 17C is controlled only by the temperature sensor 430, it may be insufficient, although cooling efficiency for the light valve must be increased in practice. In this embodiment, since the preset temperatures t1, t2, and t3 for changing the rotation speed of the intake fan 17C are varied in accordance with the detected temperature Th4 from the temperature sensor 440, it is possible to control the rotation speed of the intake fan 17C in a more suitable state, and to more reliably prevent the liquid crystal light valves 925R, 925G, and 925B from deteriorating.

9) When the detected temperature Th3 from the temperature sensor 430, or the detected temperature Th4 from the temperature sensor 440 remains higher than a predetermined preset temperature for a predetermined period, the light-source lamp 181 is extinguished. Therefore, it is possible to prevent the turning on of the main power supply and the relighting of the light-source lamp 181 from being hindered due to the kickback phenomenon described above.

The present invention is not limited to the above embodiment, and includes other constructions and the like that can achieve the objects of the present invention. The present invention also includes the following modifications and the like.

For example, while a pair of exhaust fans 16 are provided in the above embodiment, the number of exhaust fans may be one, three, or more. Furthermore, while the pair of exhaust fans 16 are controlled in a similar manner, they may be controlled separately.

Similarly, the intake fans 17A and 17B disposed in the power supply blocks 7A and 7B can be controlled separately.

While the respective cooling flow paths 41 to 43 pass through the light-source lamp unit 8 (light-source lamp 181) in the above embodiment, the present invention is not limited to the above structure, and also includes, for example, a case in which only some of the cooling flow paths 41 to 43 pass through the light-source lamp unit 8, and a case in which none of them pass through.

While cooling air flows between the upper and lower driver boards 11A and 11B in the above embodiment, this does not apply to, for example, a case in which the driver boards are replaced by a single board for the sake of size reduction. Furthermore, while the driver boards 11, the main board 12, and the lamp driving substrate 18 are disposed in the respective cooling flow paths 41 to 43, it may be appropriately determined whether or not to place such circuit substrates in the cooling flow paths.

While the intake fans 17A to 17C are provided for the cooling flow paths 41 to 43, respectively, for example, cooling air in all the cooling flow paths may be drawn in and exhausted by an exhaust fan, as in the light source cooling flow path 44. Briefly, it is satisfactory in the invention according to claim 1 that independent cooling flow paths be formed respectively for the power supply blocks and the modulation system, regardless of the presence or absence of the intake fan.

As described above, according to the present invention, since the power supply, which is relatively large among the components of the projection display device, is composed of a plurality of smaller power supply blocks that are separate from each other, the power supply blocks can be efficiently placed inside the device. Therefore, little dead space is formed inside the device, which allows size reduction of the device. Furthermore, although the power supply blocks and the optical system, particularly, the modulation system, are more apt to generate heat than other components, they can be satisfactorily cooled by forming cooling path flows respectively for the power supply blocks that are apt to generate heat, and by forming a cooling flow path for the modulation system. This can improve the cooling efficiency in the overall device.

What is claimed is:

1. A projection display device comprising:
   a light source;
   a modulation device that modulates a light beam emitted from the light source;
   a projection lens that projects the light modulated by the modulation device onto a projection plane;
   a power supply that supplies electric power for driving the projection display device;
   an exhaust fan that exhausts air inside the projection display device to outside the projection display device;
   a modulation device intake fan that draws in air from outside the projection display device for cooling components inside the projection display device, including the modulation device; and
   a power supply intake fan that draws in air from outside the projection display device for cooling components inside the projection display device, including the power supply, only the power supply intake fan being driven for a predetermined period after the projection display device is powered on.

2. The projection display device according to claim 1, the power supply intake fan being rotated at a speed lower than a normal operating speed for a predetermined period after the projection display device is powered on.

3. The projection display device according to claim 2, the power supply intake fan being rotated at a speed higher than the lower speed after the predetermined period has elapsed from a time of power-on.

4. The projection display device according to claim 1, further comprising:
   a rotation speed control device that controls a rotation speed of the exhaust fan.

5. The projection display device according to claim 4, further comprising:
   a lens that is placed in an optical path between the light source and the modulation device.

6. The projection display device according to claim 5, farther comprising:
   a first temperature detecting device that detects a temperature in a vicinity of the light source.

7. The projection display device according to claim 6, further comprising:
   a second temperature detecting device that detects a temperature in a vicinity of the lens.

8. The projection display device according to claim 6, the rotation speed of the exhaust fan being controlled based on the detected temperatures from the first temperature detecting device and the second temperature detecting device.

9. The projection display device according to claim 8, the light source being extinguished when the detected temperature from the first temperature detecting device, or the detected temperature from the second temperature detecting device, exceeds a predetermined preset temperature for a predetermined period.

10. The projection display device according to claim 1, further comprising:
    a rotation speed control device that controls a rotation speed of the modulation device intake fan.

11. The projection display device according to claim 10, further comprising:
    a third temperature detecting device that detects a temperature in a vicinity of the modulation device.

12. The projection display device according to claim 11, further comprising:
    a fourth temperature detecting device that detects a temperature of air outside the projection display device.

13. The projection display device according to claim 12, the rotation speed of the modulation device intake fan being controlled based on the detected temperatures from the third temperature detecting device and the fourth temperature detecting device.

14. The projection display device according to claim 13, a preset temperature for changing the rotation speed of the modulation device intake fan being varied based on the detected temperature from the fourth temperature detecting device.

15. The projection display device according to claim 13, the light source being extinguished when the detected temperature from the third temperature detecting device, or the detected temperature from the fourth temperature detecting device, exceeds a predetermined preset temperature for a predetermined period.

16. A projection display device comprising:

a light source;

a modulation device that modulates a light beam emitted from the light source;

a projection lens that projects the light modulated by the modulation device onto a projection plane;

a power supply that supplies electric power for driving the projection display device;

an exhaust fan that exhausts air inside the projection display device to outside the projection display device;

a modulation device intake fan that draws in air from outside the projection display device for cooling components inside the projection display device, including the modulation device; and a power supply intake fan that draws in air from outside the projection display device for cooling components inside the projection display device, including the power supply, only the power supply intake fan being driven for a predetermined period after the projection display device is powered on;

a rotation speed control device that controls a rotation speed of the exhaust fan;

a lens that is placed in the optical path between the light source and the modulation device;

a first temperature detecting device that detects a temperature in a vicinity of the light source;

a second temperature detecting device that detects a temperature in a vicinity of the lens, the rotation speed of the exhaust fan being controlled based on the detected temperatures from the first temperature detecting device and the second temperature detecting device;

a rotation speed control device that controls a rotation speed of the modulation device intake fan;

a third temperature detecting device that detects a temperature in a vicinity of the modulation device; and a fourth temperature detecting device that detects a temperature of air outside the projection display device, the rotation speed of the modulation device intake fan being controlled based on the detected temperatures from the third temperature detecting device and the fourth temperature detecting device.

17. The projection display device according to claim 16, the light source being extinguished when the detected temperature from the first temperature detecting device, or the detected temperature from the second temperature detecting device, exceeds a predetermined preset temperature for a predetermined period.

18. The projection display device according to claim 16, a preset temperature for changing the rotation speed of the modulation device intake fan being varied based on the detected temperature from the fourth temperature detecting device.

19. The projection display device according to claim 16, the light source being extinguished when the detected temperature from the third temperature detecting device, or the detected temperature from the fourth temperature detecting device, exceeds a predetermined preset temperature for a predetermined period.

* * * * *